United States Patent
Toyama (10) Patent No.: US 8,279,207 B2
(45) Date of Patent: Oct. 2, 2012

(54) INFORMATION PROCESSING APPARATUS, INFORMATION PROCESSING METHOD, AND PROGRAM

(75) Inventor: Takeshi Toyama, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 12/124,344

(22) Filed: May 21, 2008

(65) Prior Publication Data

US 2008/0291180 A1    Nov. 27, 2008

(30) Foreign Application Priority Data

May 22, 2007    (JP) ................... 2007-135345

(51) Int. Cl.
*G09G 5/00*    (2006.01)
(52) U.S. Cl. ............... 345/204; 348/739; 348/84
(58) Field of Classification Search .......... 348/207, 348/739, 84
See application file for complete search history.

(56) References Cited

U.S. PATENT DOCUMENTS

2004/0150596 A1*    8/2004    Uchida et al. ............ 345/84

FOREIGN PATENT DOCUMENTS

JP    2006-108962 A    4/2006
WO    03/019935 A1    3/2003

* cited by examiner

*Primary Examiner* — Alexander S Beck
*Assistant Examiner* — Jeffrey Steinberg
(74) *Attorney, Agent, or Firm* — Canon USA Inc IP Division (57) ABSTRACT

An information processing apparatus capable of communicating with an image display apparatus includes an acquiring unit and a transmitting unit. The acquiring unit is configured to acquire a first image. The transmitting unit is configured to transmit the first image, first additional information that indicates a process by which a second image is to be displayed simultaneously while the first image is displayed, and second additional information that indicates a frame at which displaying of the second image by the process is to be started, to the image display apparatus.

11 Claims, 11 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus that outputs image data to an image display apparatus.

2. Description of the Related Art

A usage pattern of viewing an image content from an information processing apparatus (e.g., a personal computer) on an image display apparatus (e.g., a digital television) by connecting them via an interface, such as the high-definition multimedia interface (HDMI), has become popular in recent years.

In such a usage pattern, an operation screen generated by an application running on the information processing apparatus (hereinafter referred to as an application screen) is input as a video signal into the image display apparatus via the HDMI.

The image display apparatus receives the application screen as a video signal and displays it on a display unit. That is, as in the case of an information processing apparatus displaying it on a display unit dedicated thereto or incorporated therein in a conventional use, the image display apparatus can display data of the application.

There is a technique of displaying a television program being superimposed on an application screen while displaying the application screen on a display unit of an image display apparatus.

A technique of informing a displayed position and size of a telecasting screen (i.e., broadcast screen) via a universal serial bus (USB) when an application screen from a personal computer is combined with a telecasting screen is disclosed in Japanese Patent Laid-Open No. 2006-108962.

However, in the above technique, because the displayed position and size of the broadcast screen are merely informed in a simple manner, the image display apparatus cannot generate a broadcast screen that responds to changes in the application screen. That is, during the process in which the application screen is changing according to a user operation or the like (for example, pull-down menu operation or pup-up window startup), the displayed position and size of the broadcast screen cannot be modified. As a result, misregistration in combining occurs. In addition, it is impossible to change the broadcast screen from a hidden state to a displayed state, and vice versa.

SUMMARY OF THE INVENTION

The present invention provides an information processing apparatus that can suppress misregistration in combining from occurring when an image display apparatus displays a composite screen in which an application screen of the information processing apparatus and a broadcast screen are combined even when an operation screen (application screen) changes.

In accordance with an aspect of the present invention, an information processing apparatus capable of communicating with an image display apparatus includes an acquiring unit and a transmitting unit. The acquiring unit is configured to acquire a first image. The transmitting unit is configured to transmit the first image, first additional information that indicates a process by which a second image is to be displayed simultaneously while the first image is displayed, and second additional information that indicates a frame at which displaying of the second image by the process is to be started, to the image display apparatus.

According to an embodiment of the present invention, when the image display apparatus displays a composite screen in which an operation screen of an information processing apparatus and a broadcast screen are combined, the composite screen can be generated so as to conform to a change in the operation screen.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described in detail with reference to the accompanying drawings. The components described in these embodiments are only for purpose of illustration and are not intended to limit the scope of the present invention to them. In all of the drawings for the embodiments described below, the same reference numerals are used for the same or similar parts.

First Embodiment

Figure 1:
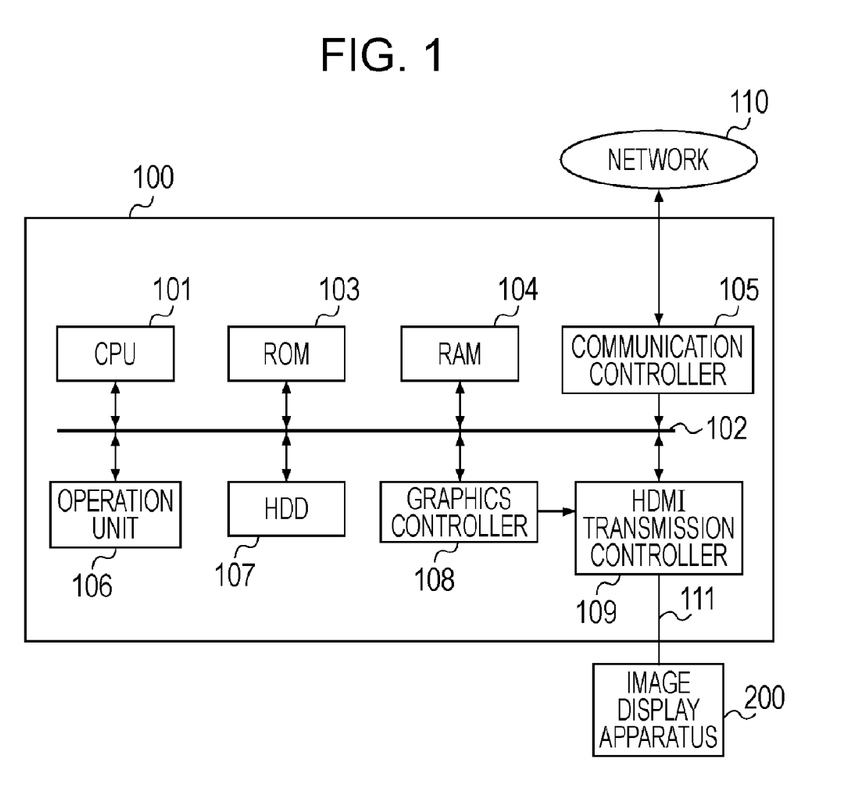
FIG. 1 is a block diagram illustrating a configuration example of an information processing apparatus according to a first embodiment of the present invention.

FIG. 1 is a block diagram illustrating a configuration example of an information processing apparatus 100 according to the present embodiment.

The information processing apparatus 100 is in a state in which it can communicate with an image display apparatus 200. The information processing apparatus 100 is configured to generate an image signal and supply the image signal to the image display apparatus 200 via an HDMI cable 111.

A central processing unit (CPU) 101 controls processing units of the information processing apparatus 100 connected to each other with a bus 102. A computer program executable by the CPU 101 is stored in a read-only memory (ROM) 103 or a hard disk drive (HDD) 107 and is loaded into a memory space within a random-access memory (RAM) 104 as necessary.

A communication controller 105 is connected to a network 110, such as a local-area network (LAN), under control of the CPU 101 and executes data communications with a different device operating on the network.

An operation unit 106 accepts a user operation from a keyboard, a mouse, or a remote control (not shown).

A graphics controller 108 has the function of inputting an application screen generated by the CPU 101 into an internal frame buffer memory.

An HDMI transmission controller 109 has the function of multiplexing a video signal, an audio signal, and a control signal under the HDMI standard and transmitting the multiplexed signal to a device connected thereto (in the present embodiment the image display apparatus 200) via the HDMI cable 111.

The HDMI transmission controller 109 reads screen data input to the frame buffer of the graphics controller 108 and transmits it as an image signal under the HDMI standard to the image display apparatus 200.

Figure 2:
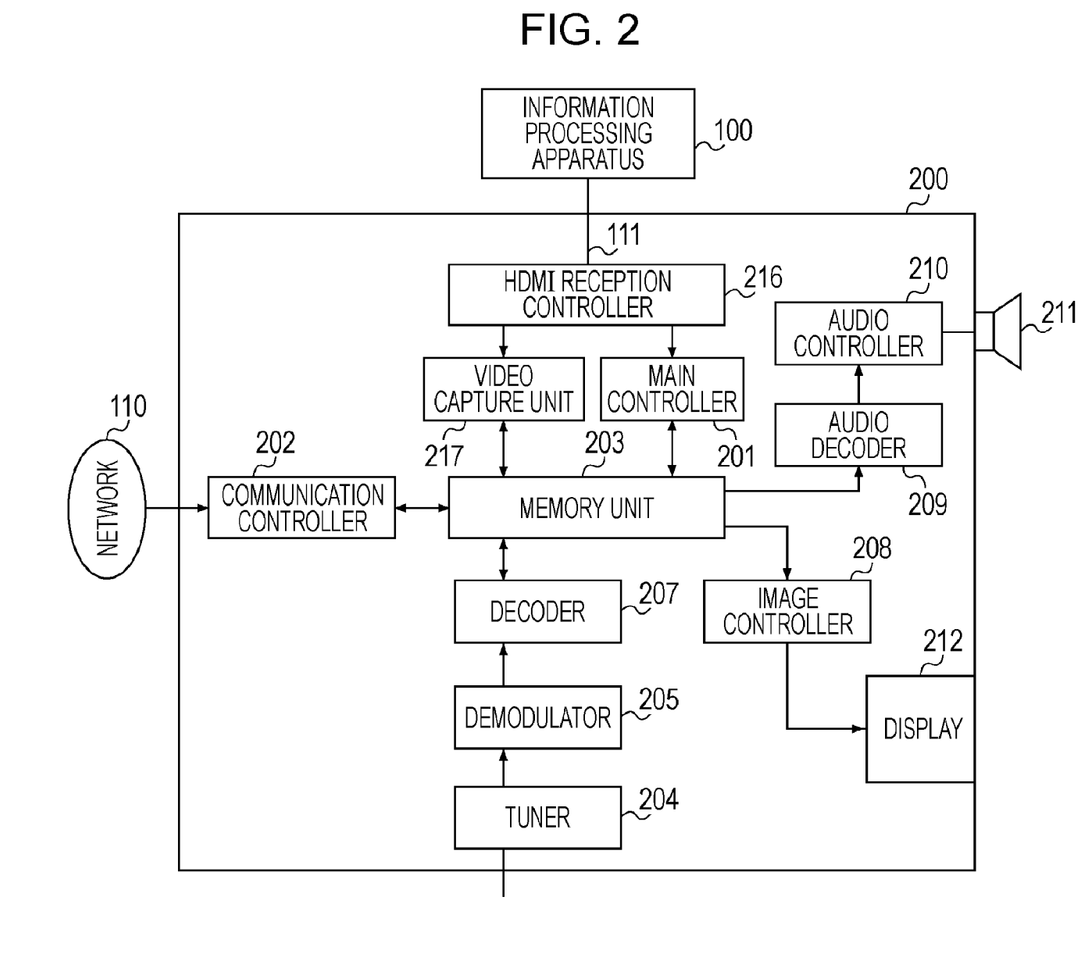
FIG. 2 is a block diagram of an image display apparatus according to the first embodiment.

FIG. 2 is a block diagram of the image display apparatus 200 according to the present embodiment.

A main controller 201 executes a computer program stored in an internal flash ROM or the like and controls the whole image display apparatus 200.

A communication controller 202 controls communications with an external device via the network 110 such that the image display apparatus 200 can receive data.

A memory unit 203 incorporates a synchronous dynamic RAM (SDRAM) and a memory controller and stores data for use in each processing unit of the image display apparatus 200 in the SDRAM.

A tuner 204 receives a digital broadcast signal via an antenna (not shown).

A demodulator 205 demodulates a digital broadcast signal from the tuner 204 into stream data.

A decoder 207 decodes stream data from the demodulator 205 or stream data stored in the memory unit 203 after being received via the network 110, separates it by type (e.g., video, audio, and section data), and outputs them to the memory unit 203.

The decoder 207 decodes video stream stored in the memory unit 203 under its coding system (e.g., MPEG2) and outputs the decoded video data to the memory unit 203.

The decoder 207 can simultaneously decode a plurality of video streams. For example, the decoder 207 can simultaneously decode a video stream input through the tuner 204 and a video stream input through the communication controller 202 and can output the decoded video data sets to the memory unit 203.

The main controller 201 extracts graphics data (e.g., data of characters and figures on an application screen) from section data or the like stored in the memory unit 203, decodes it, and outputs the decoded graphics data to the memory unit 203.

An image controller 208 performs scaling processing and combining processing on video data in the memory unit 203 and outputs it to a display 212.

An audio decoder 209 decodes an audio stream stored in the memory unit 203 or an audio stream input from an HDMI reception controller 216 under its coding system (e.g., MPEG2 AAC). The resultant of the decoding is output to a speaker 211 via an audio controller 210.

The HDMI reception controller 216 separates a multiplex signal transmitted via the HDMI cable 111 into a video signal, an audio signal, and a control signal and sends them to their respective processing units of the image display apparatus 200. The video signal is sent to a video capture unit 217, the audio signal is sent to the audio decoder 209, and the control signal is sent to the main controller 201.

The video capture unit 217 receives a video signal from the HDMI reception controller 216 and outputs it to the memory unit 203.

The information processing apparatus 100 having the above configuration outputs an application screen to the image display apparatus 200 via the HDMI cable 111. The image display apparatus 200 combines the application screen and a broadcast screen from the tuner 204 into a composite screen and displays the composite screen on the display 212. The above-described configuration enables the broadcast screen to be displayed simultaneously while the application screen is displayed.

Additionally, when a process by which a broadcast screen is displayed to be changed in response to a change in an application screen, information indicating the modified display process (modification information) and information indicating the timing of starting transmission of a video stream at which the modification is made (timing information) are supplied to the image display apparatus 200.

The image display apparatus 200 identifies a video frame corresponding to an application screen with which a broadcast screen modified in accordance with modification information from the information processing apparatus 100 is to be combined, on the basis of timing information from the information processing apparatus 100.

Figure 7:
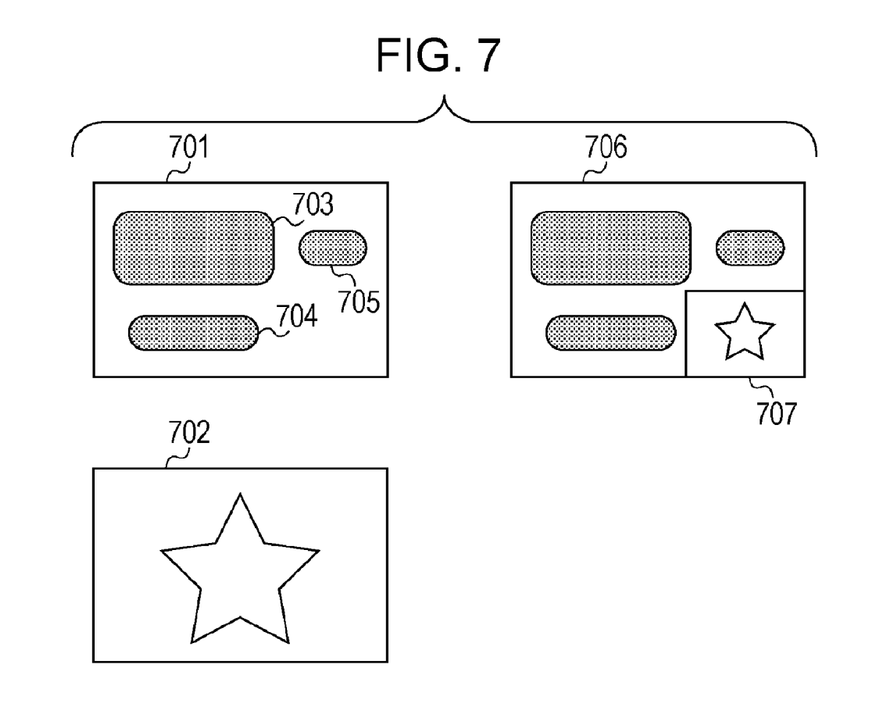
FIG. 7 illustrates an example of a composite of an application screen and a broadcast screen according to the first embodiment.

FIG. 7 illustrates an example of a composite of an application screen and a broadcast screen in the image display apparatus 200.

An application screen 701 and a broadcast screen 702 each have a size of 1,920 pixels in the horizontal direction by 1,080 pixels in the vertical direction.

A screen 706 is a screen into which the application screen 701 and the broadcast screen 702 are combined (hereinafter referred to as a "composite screen"). In the composite screen 706, the application screen 701 being displayed at the same magnification is combined with a broadcast screen 707 into which the broadcast screen 702 is reduced.

The size of the reduced broadcast screen 707 is determined by the CPU 101 such that reduced broadcast screen 707 does not overlap displayed elements 703, 704, and 705. The determined size is supplied to the image display apparatus 200 as modification information via the HDMI cable 111. To modify the displayed position of the reduced broadcast screen 707 in response to a change in the displayed elements 703 to 705, information that indicates the coordinates of the modified displayed position of the reduced broadcast screen 707 is supplied to the image display apparatus 200 as modification information.

Figure 3:
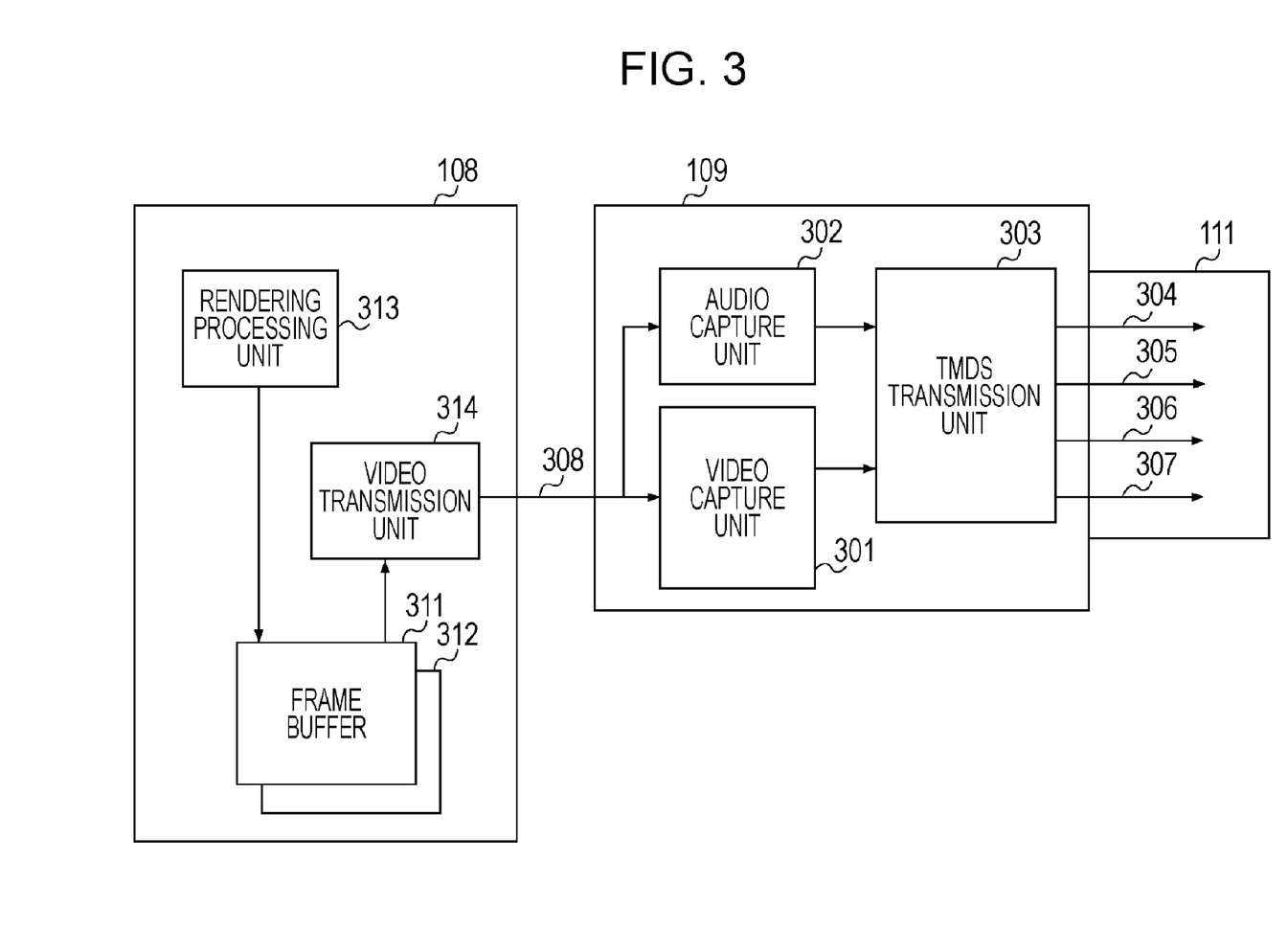
FIG. 3 is a block diagram illustrating a configuration example of a graphics controller and an HDMI transmission controller in the information processing apparatus according to the first embodiment.

FIG. 3 is a block diagram illustrating a configuration example of the graphics controller 108 and the HDMI transmission controller 109 in the information processing apparatus 100 according to the present embodiment.

In the graphics controller 108, a rendering processing unit 313 makes a frame buffer 311 or 312 store video data.

Figure 4:
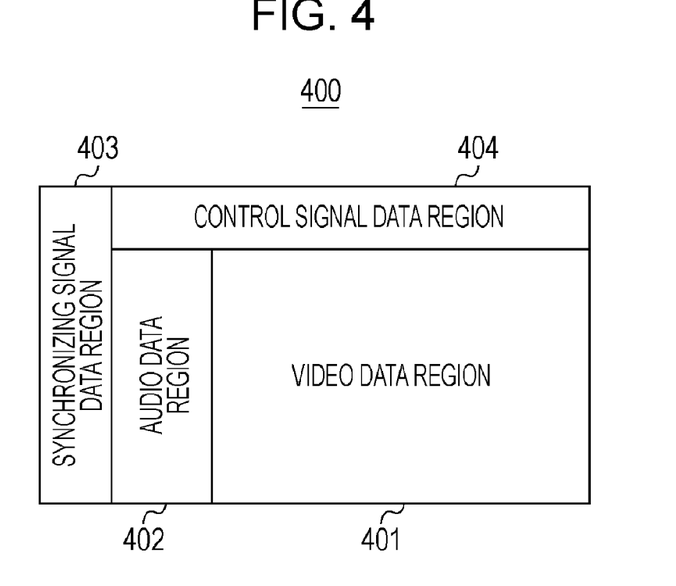
FIG. 4 illustrates a format of a transmission frame based on the HDMI standard.

The frame buffers 311 and 312 can store transmission data based on a transmission format of one frame under the HDMI standard illustrated in FIG. 4.

FIG. 4 illustrates a format of a transmission frame stored in the frame buffers 311 and 312. This transmission format is a two-dimensional format in which the horizontal direction and vertical direction of the video frame correspond to the lateral direction and the longitudinal direction of the drawing, respectively. A transmission frame 400 contains a video data region 401 in which video data is stored, an audio data region 402 in which audio data is stored, a synchronizing signal data region 403 in which a synchronizing signal is stored, and a control signal data region 404 in which control signal data is stored.

A video transmission unit 314 reads transmission data corresponding to one frame from the frame buffer 311 or 312 and supplies it as transmission data 308 to the HDMI transmission controller 109.

The above configuration of the transmission data allows control data other than video data to be transmitted under the HDMI standard by addition of desired information to the control signal data region 404.

The frame buffers 311 and 312 have a double buffer structure. When the rendering processing unit 313 is storing transmission data in one of the frame buffers 311 and 312 stores (back frame buffer), the video transmission unit 314 is reading transmission data from the other one of the frame buffers 311 and 312 (front frame buffer). Switching between the front frame buffer and the back frame buffer appropriately enables changing of a screen and replaying of moving images.

In the HDMI transmission controller 109, a video capture unit 301 captures video data from the transmission data 308 supplied from the graphics controller 108. An audio capture unit 302 captures audio data from the transmission data 308. A transition minimized differential signaling (TMDS) transmission unit 303 transmits the captured video data and audio data based on TMDS signal specifications (data lines 304, 305, and 306 and a clock line 307) to the image display apparatus 200 under the HDMI standard.

Figure 5:
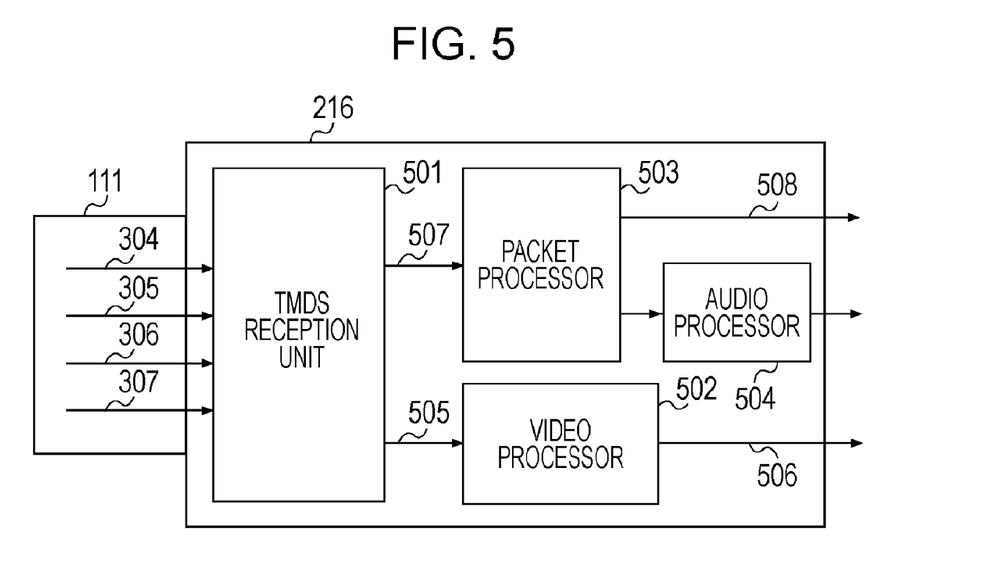
FIG. 5 is a block diagram illustrating a configuration example of an HDMI reception controller in the image display apparatus according to the first embodiment.

FIG. 5 is a block diagram illustrating a configuration example of the HDMI reception controller 216 in the image display apparatus 200 according to the present embodiment.

A TMDS reception unit 501 separates a TMDS signal received through the HDMI cable 111 into video data, audio data, and control signal data.

The TMDS signal received through the HDMI cable 111 is divided into data 505 to be transmitted to a video processor 502 and data 507 to be transmitted to a packet processor 503.

The video processor 502 receives video data in the transmission frame 400 illustrated in FIG. 4. Video data 506 is sequentially captured by the video capture unit 217 as a video frame, and is further sent to a capture memory in the memory unit 203.

The packet processor 503 receives audio data and control signal data in the transmission frame 400 illustrated in FIG. 4.

The packet processor 503 supplies audio data to an audio processor 504. The audio data is then decoded by the audio decoder 209 and is output to the speaker 211 via the audio controller 210.

The packet processor 503 outputs control signal data 508 to the main controller 201. One form performing this supply can be a register readable by the main controller 201. The value of the register is read by the main controller 201 on an as needed basis. However, as for control signal data requiring real-time processing, the packet processor 503 has the function of informing the main controller 201 of the control signal data by an interrupt.

The received control signal data is supplied to the main controller 201 by an interrupt, whereas the received video data sequentially passes through the video capture unit 217, the memory unit 203, and the image controller 208 without passing through the main controller 201 and is processed therein in this order.

The main controller 201 can determine which of the video capture unit 217, the memory unit 203, and the image controller 208 video data that existed in the same transmission frame as acquired control signal data is being processed by the manner described below.

Video data is processed in the video capture unit 217, the memory unit 203, and the image controller 208 with constant delay times.

The main controller 201 determines when video data existing in the same transmission frame as control signal data informed by an interrupt is processed in the image controller 208 from the above delay times.

Similarly, the main controller 201 can determine when video data present in a transmission frame after a predetermined number of frames from a transmission frame in which control signal data informed by an interrupt is present is processed in the image controller 208 from the above delay times and the above predetermined number of frames.

Audio data and control signal data are both transmitted as packet data added in a data island period in the HDMI standard.

Figure 6:
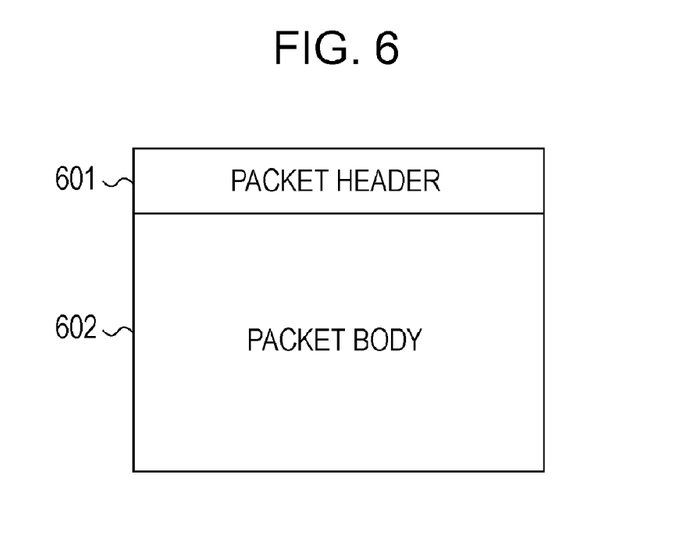
FIG. 6 illustrates a format of packet data transmitted under the HDMI standard.

FIG. 6 illustrates a relationship between a format of packet data transmitted under the HDMI standard and control information according to the present embodiment.

Information that indicates a packet type is added to a packet header 601. The packet processor 503 in the image display apparatus 200 separates audio data and control signal data according to the packet type contained in the packet header 601.

Entity information corresponding to the packet type is added to a packet body 602. For example, in the case of a packet for transmitting an audio sample packet, such as L-PCM, a value that indicates it (0x01) is added to the packet header 601 and audio sample data is added to the packet body 602 as entity information.

Modification information and timing information are added to the packet body 602.

In the example shown in FIG. 6, information indicating that a modification is "resizing a broadcast screen", "the coordinates of the broadcast screen", "the width of the broadcast screen", and "the height of the broadcast screen" is added as modification information. The number of frames is added as timing information. The number of frames here indicates that a changed application screen corresponding to modification information will be transmitted as video data in a second transmission frame 400 after this number of frames from a first transmission frame 400 to which the modification information and timing information are added as packet data.

Figure 8:
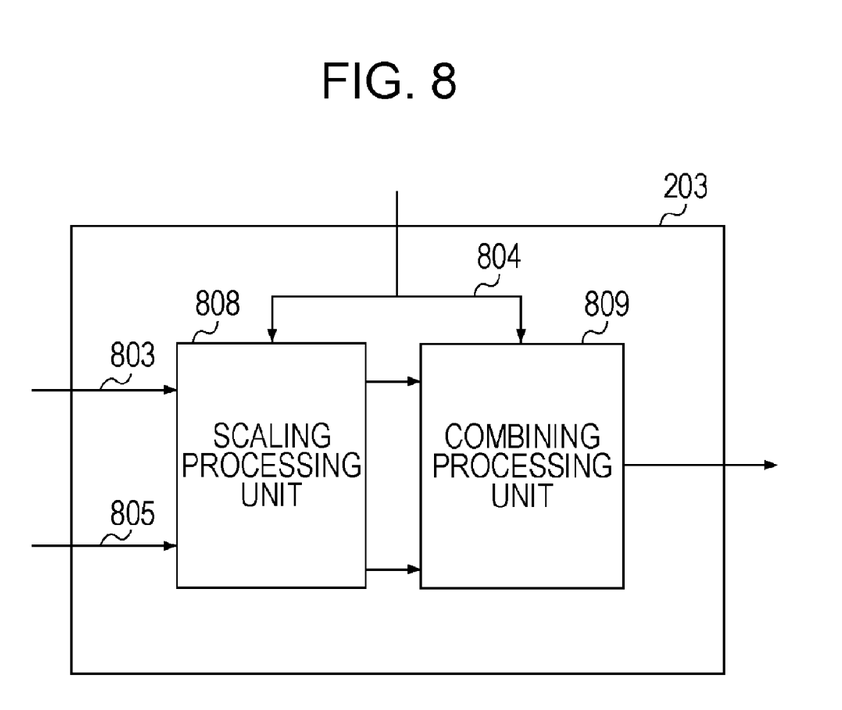
FIG. 8 is a block diagram illustrating a configuration example of a memory unit in the image display apparatus according to the first embodiment.

FIG. 8 is a block diagram illustrating a configuration example of the memory unit 203 in the image display apparatus 200. The memory unit 203 combines an application screen and a broadcast screen together.

The application screen 701 from the information processing apparatus 100 is input as frame memory from the video capture unit 217 to the memory unit 203 through a path 803.

The broadcast screen 702 from the tuner 204 is input as frame memory from the decoder 207 to the memory unit 203 through a path 805.

Modification information and timing information are read by the main controller 201. The main controller 201 converts them into an image control command and transmits it to the image controller 208.

The image controller 208 acquires the image control command from the main controller 201 and performs scaling processing 808 and combining processing 809 for the application screen 701 and the broadcast screen 702 in accordance with that command 804.

Thus, video frames from the HDMI reception controller 216 and the decoder 207 are combined by the scaling processing 808 and combining processing 809, and a resultant screen is displayed on the display 212.

Frame memory in the memory unit 203 has a so-called double-buffer structure such that input frame memory and output frame memory are alternately switched.

The main controller 201 can acquire the modification information and application-screen timing information by a real-time informing way, such as an interrupt, after a predetermined period of time (a period of time that is sufficiently shorter than a frame period) from when the HDMI reception controller 216 starts receiving the transmission frame 400.

This enables the main controller 201 to determine when video data in a transmission frame 400 to which the modification information and the timing information are added is combined by the combining processing 809.

Similarly, the time when video data in a transmission frame 400 specified in the timing information is combined by the combining processing 809 can be determined.

Figure 9A:
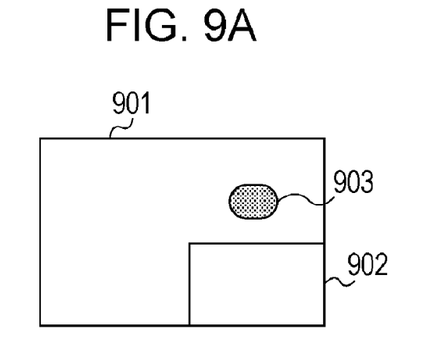
FIG. 9A illustrates an example of a composite of an application screen and a broadcast screen according to the first embodiment.
Figure 9B:
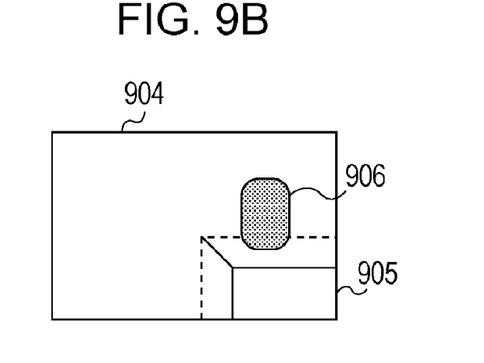
FIG. 9B illustrates an example of the case where the broadcast screen is modified in response to a change in the application screen according to the first embodiment.
Figure 9C:
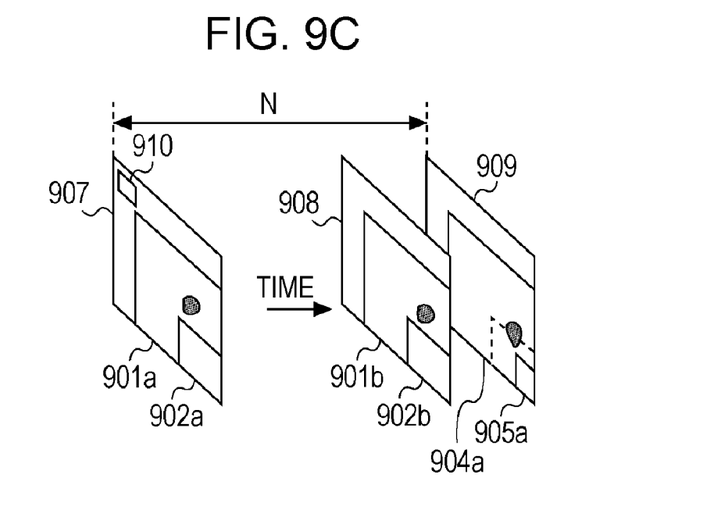
FIG. 9C illustrates an example of transmission of frames in the case where the broadcast screen is modified in response to a change of the application screen according to the first embodiment.

FIGS. 9A to 9C illustrate an example of frame transmission when the broadcast screen 702 is modified in response to a change in the application screen 701 according to the present embodiment.

In FIG. 9A, a screen 901 represents an application screen prior to a change, and a screen 902 represents a broadcast screen prior to a modification. In FIG. 9B, a screen 904 represents an application screen in which the application screen 701 is changed, and a screen 905 represents a broadcast screen in which the broadcast screen 702 is modified.

FIG. 9B illustrates a state in which the screen 902 is reduced to the screen 905 to avoid an overlap between the screen 902 and a displayed element 906 caused by a change from a displayed element 903 within the screen 901 in FIG. 9A to the displayed element 906.

FIG. 9C illustrates how frames are transmitted from the information processing apparatus 100 when the above change is made. Each of transmission frames 907, 908, and 909 corresponds to the transmission frame 400. Screens 901a, 901b, and 904a are added to the transmission frames 907, 908, and 909 as their respective video data.

Screens 902a, 902b, and 905a represent the broadcast screen 702 to be combined with the screen 901a, that to be combined with the screen 901b, and that to be combined with the screen 904a, respectively.

This example shows that the changed screen 904a is transmitted on and after the frame 909 being an N-th frame counting from the frame 907 and that combining the screen 904a and the screen 905a at this timing does not cause misregistration in combining in the image display apparatus 200.

The modification information and timing information are added to packet data 910.

In the packet data 910 in this case, information that indicates a process by which the screen 905a is to be displayed (e.g., displayed position and size) is added to the modification information, and information that indicates the number N of frames is added to the timing information.

The transmission process illustrated in FIGS. 9A to 9C enables the main controller 201 of the image display apparatus 200 to acquire the modification information and the timing information from the packet data 910 and to control the timing of combining the screen 904a and the screen 905a.

That is, the main controller 201 can provide the image controller 208 with an instruction about whether the modification is to be made at that timing using the timing information when issuing a command for modifying the current broadcast screen into a broadcast screen based on the modification information after receiving the packet data 910.

Figure 10:
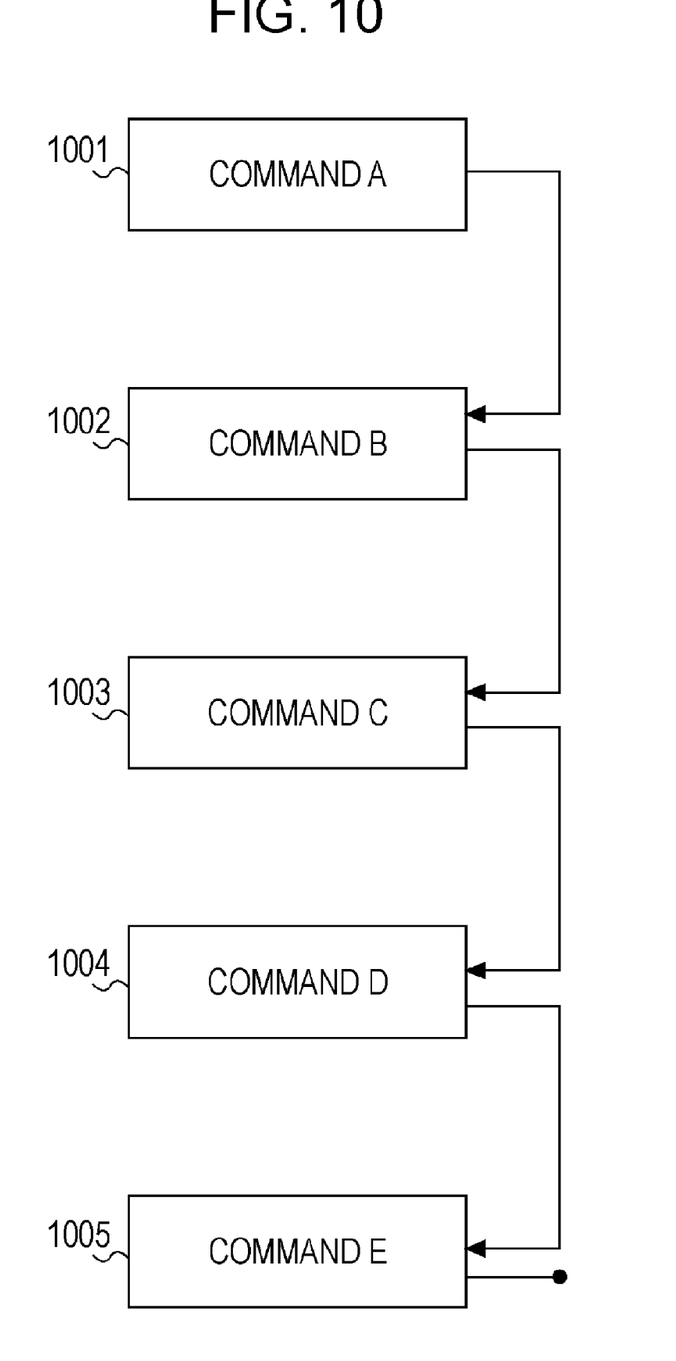
FIG. 10 illustrates a structure of commands issued from a main controller to an image controller in the image display apparatus according to the first embodiment.

FIG. 10 illustrates a structure of commands issued from the main controller 201 to the image controller 208 in the image display apparatus 200 according to the present embodiment.

Commands 1001 to 1005 are commands to be issued to the image controller 208. For example, commands for real-time image control to be performed by the image controller 208, such as a command for setting a degree of reduction in the scaling processing 808 illustrated in FIG. 8, are added.

The commands 1001 to 1005 can be connected in a list structure. This enables the image controller 208 to perform real-time image control using a command sequence without interaction with the main controller 201.

In each command, the timing of execution of the command can be set, so each command can be executed after a designated number of frames from when the command is issued.

The main controller 201 specifies the timing of execution of a command generated based on the modification information in accordance with the number of frames specified in the timing information.

Thus, the image controller 208 can acquire a command for real-time image control together with information about the timing of execution of the command in advance. Accordingly, the image controller 208 can combine the changed application screen 701 and the modified broadcast screen 702 without causing misregistration in combining.

Figure 11A:
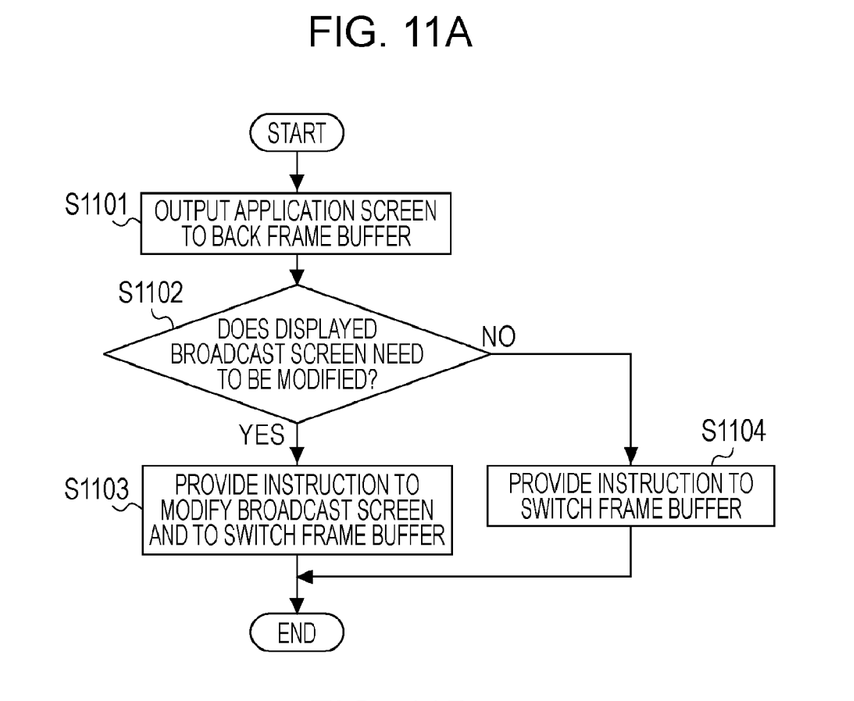
FIG. 11A is a flowchart of processing performed by a CPU in the information processing apparatus according to the first embodiment.
Figure 11B:
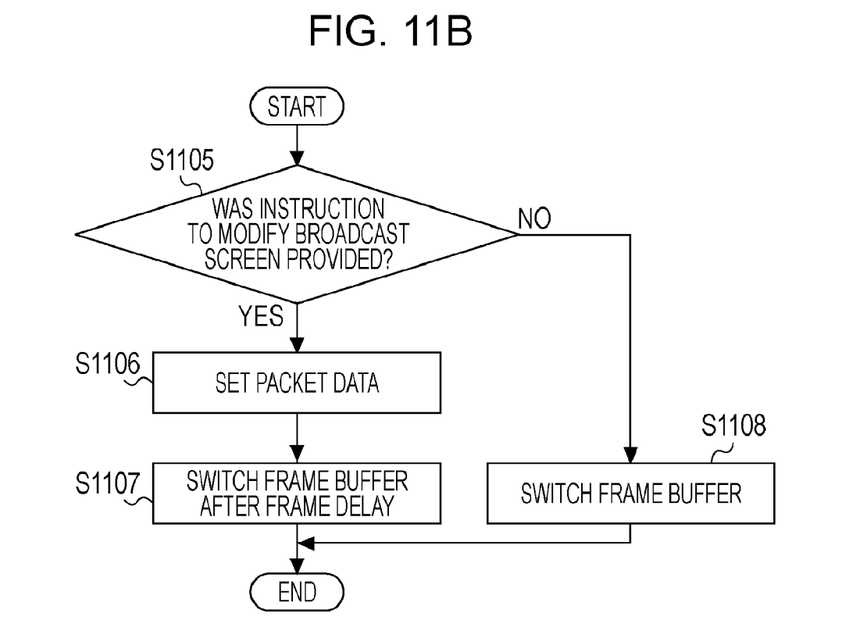
FIG. 11B is a flowchart illustrating processing performed by the graphics controller in the information processing apparatus according to the first embodiment.

FIGS. 11A and 11B are flowcharts for describing processing performed by the information processing apparatus 100 according to the present embodiment.

Steps S1101 to S1104 in FIG. 11A are performed by the CPU 101 every time an application program renews an application screen.

For example, when it becomes necessary to render a new pull-down menu according to a pull-down menu operation, steps S1101 to 1104 are performed.

Steps S1105 to S1108 in FIG. 11B are performed by the graphics controller 108.

In step S1101, the CPU 101 outputs an application screen to the back frame buffer of the graphics controller 108.

In step S1102, the CPU 101 determines whether it is necessary to modify a broadcast screen to be combined with the application screen output in step S1101. If the modification is necessary (YES in step S1102), flow proceeds to step S1103; if it is not necessary (NO in step S1102), flow proceeds to step S1104.

One example of the case in which it is determined that the modification is necessary is that an overlap between the displayed element 705 and the broadcast screen 702 (902) will be produced by downward extension of the displayed element 705 (906), as illustrated in FIG. 9B.

In this case, the CPU 101 determines that it is necessary to reduce the broadcast screen 702 in order to avoid an overlap between the displayed element 705 and the broadcast screen 702.

In step S1103, the CPU 101 provides an instruction to switch the frame buffer (between the front frame buffer and the back frame buffer).

At the same time, the CPU 101 also provides an instruction to modify the broadcast screen 702. More specifically, the CPU 101 provides both information indicating that the broadcast screen will be modified and an instruction about a process by which a modified broadcast screen is to be displayed (e.g., displayed position and/or size).

For example, in the example illustrated in FIG. 9B, a displayed position or size that avoids the broadcast screen 702 from overlapping the displayed element 705 is calculated, and the calculation result is designated as the process by which the modified broadcast screen is to be displayed.

Also in step S1104, the CPU 101 provides an instruction to switch the frame buffer. However, the CPU 101 does not provide an instruction to modify the broadcast screen.

In step S1105 in FIG. 11B, the graphics controller 108 determines whether an instruction to switch the frame buffer from the CPU 101 is accompanied by an instruction to modify the broadcast screen.

If there is no instruction to modify the broadcast screen (NO in step S1105), flow proceeds to step S1108, where the frame buffer is switched between the front frame buffer and the back frame buffer.

If there is an instruction to modify the broadcast screen (YES in step S1105), flow proceeds to step S1106, where modification information and timing information are generated in accordance with the instruction to modify the broadcast screen and the generated information is set in packet data in the back frame buffer.

Therefore, as illustrated in the frame 907 of FIG. 9C, the packet data to which the application screen 701 prior to a change, information on a modified broadcast screen, and application-screen timing information are added is transmitted under the HDMI standard.

The buffer that stores packet data of the frame buffer has a double-buffer structure, so a buffer for writing and a buffer for transmission can be switched as appropriate.

After packet data to which the modification information and the timing information are added is transmitted, the modification information is supplied to the image display apparatus 200 only once by switching of the buffer again. The modification information may be supplied a plurality of times in consideration of transmission error. This can be realized by a structure in which the number of frames in the timing information is decremented every time one frame is transmitted.

In step S1107, after the number of frames specified in the timing information generated in step S1106, the frame buffer is switched between the front frame buffer and the back frame buffer.

Figure 12:
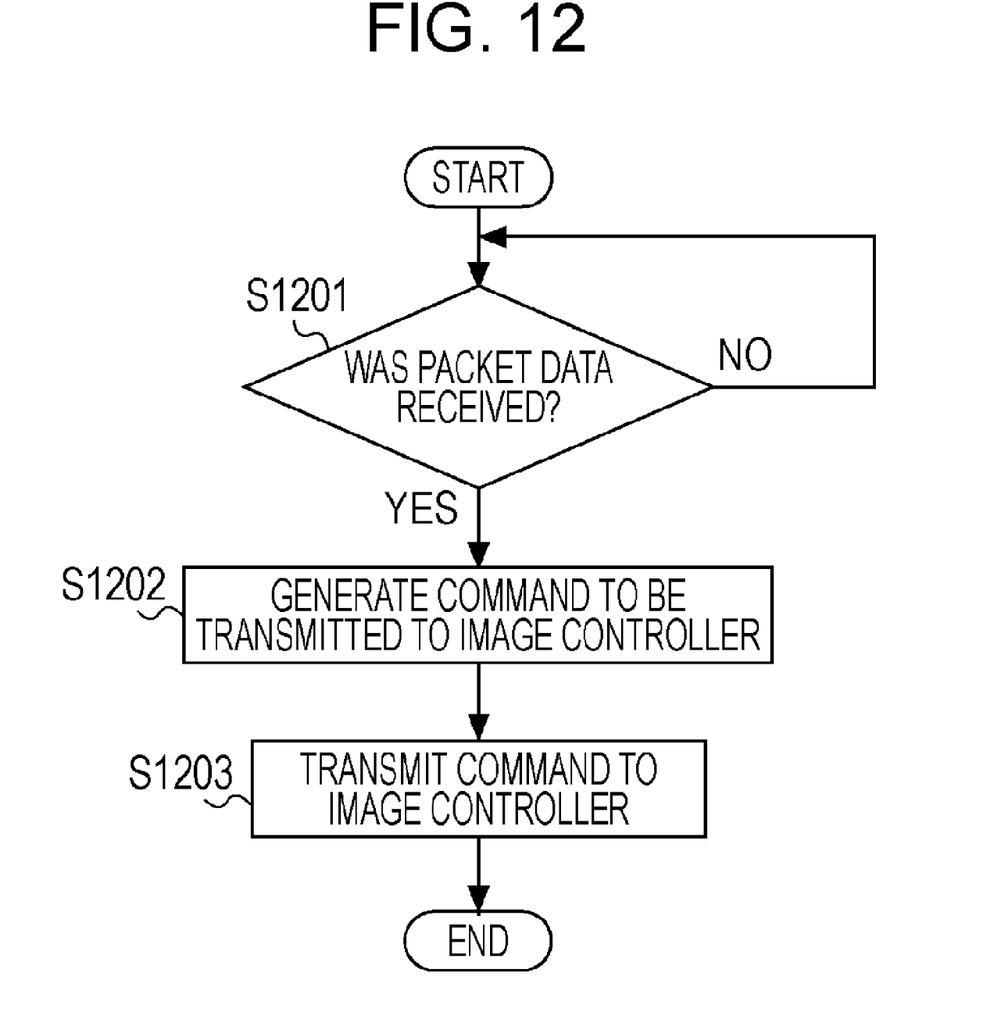
FIG. 12 is a flowchart of processing performed by the image display apparatus according to the first embodiment.

FIG. 12 is a flowchart for describing processing performed by the image display apparatus 200 according to the present embodiment.

In step S1201, the main controller 201 determines whether packet data to which the modification information and the timing information are added has been received.

In step S1202, the main controller 201 generates commands to be transmitted to the image controller 208 in accordance with the modification information and the timing information in the received packet data.

At this time, the main controller 201 specifies the timing of execution of a command generated based on the modification information in accordance with the number of frames specified in the timing information.

In step S1203, the main controller 201 transmits the commands generated in step S1202 to the image controller 208.

This enables the image controller 208 to acquire the command for real-time image control together with information on the timing of execution thereof in advance. Accordingly, a changed application screen and a modified broadcast screen can be combined without causing misregistration in combining.

As described above, according to the first embodiment, when a broadcast screen is to be modified in response to a change in an application screen, both modification information and timing information are supplied to the image display apparatus 200 via the HDMI cable 111.

The image display apparatus 200 identifies a video frame corresponding to an application screen to be combined with a broadcast screen modified in accordance with the modification information, from the timing information.

As described above, an information processing apparatus according to the present embodiment first acquires a first image. Then, the information processing apparatus transmits the first image and first additional information that indicates a process by which a second image is to be displayed simultaneously while the first image is displayed, to an image display apparatus. In addition, the information processing apparatus transmits second additional information that indicates a frame at which displaying of the second image by the process is to be started to the image display apparatus. The image display apparatus acquires the second image. The image display apparatus receives the first image and the first additional information that indicates a process by which the second image is to be displayed simultaneously while the first image is displayed, from the information processing apparatus. In addition, the image display apparatus receives the second additional information that indicates a frame at which displaying of the second image by the process is to be started, from the information processing apparatus.

Therefore, when the image display apparatus displays a composite screen into which an operation screen of the information processing apparatus and a broadcast screen are combined, the occurrence of misregistration in combining can be suppressed even when the operation screen is changed.

In the present embodiment, a reduction in the broadcast screen is described as an example of modification of the display process by which the broadcast screen is displayed in response to a change in the application screen. However, other modifications of the display process can be made.

For example, changing the broadcast screen from a hidden state to a displayed state, and vice versa, can be made if information indicating it is added as the modification information.

Second Embodiment

Figure 13A:
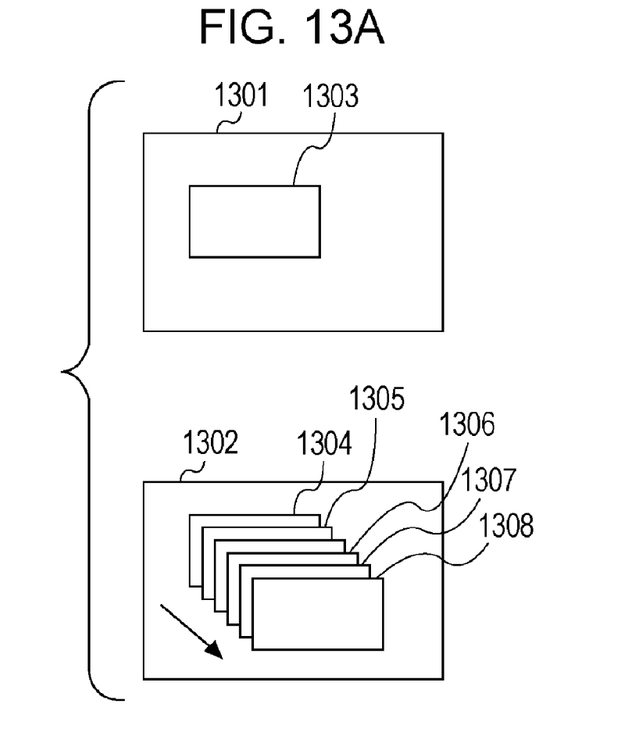
FIG. 13A illustrates an example of the case where the broadcast screen is modified in response to a change in the application screen according to a second embodiment.

FIG. 13A illustrates an example of frame transmission from the information processing apparatus 100 in the case where a broadcast screen is modified in response to a change in an application screen according to the present embodiment.

A screen 1301 represents an application screen prior to a change. A screen 1303 represents a broadcast screen prior to a modification.

A screen 1302 represents a changed application screen. Screens 1304 to 1308 represent the process in which the broadcast screen is successively moving from 1304 to 1308 in units of frames (hereinafter referred to as M frames) in response to the change in the application screen.

Figure 13B:
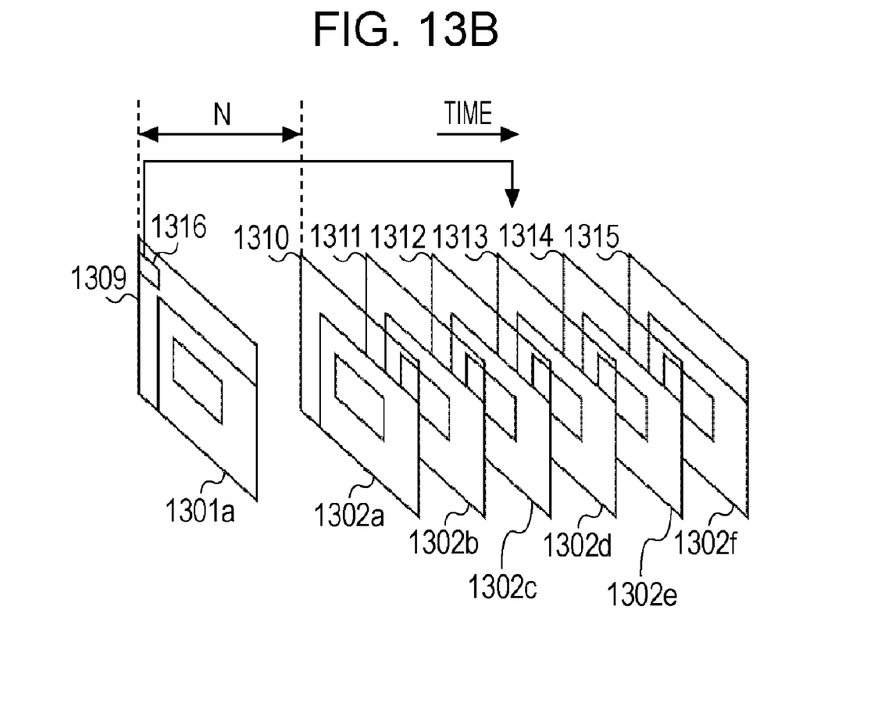
FIG. 13B illustrates an example of the process of frame transmission in the case where the broadcast screen is modified in response to a change in the application screen according to the second embodiment.

FIG. 13B illustrates an example of the process of frame transmission from the information processing apparatus 100 in the case where the above change is made. Each of transmission frames 1309 and 1310 to 1315 corresponds to the transmission frame 400. Screens 1301a, 1302a, 1302b, 1302c, 1302d, 1302e, and 1302f are added to the transmission frames 1309 and 1310 to 1315 as their respective video data.

The screen 1301a is an application screen prior to a change. The screens 1302a to 1302e are application screen being in the process of being changed. The screen 1302f is an application screen that the change has been completed.

In this example, the application screen starts changing at the frame 1310 being an N-th frame counting from the frame 1309, the application screen changes in units of M frames, and the change is completed at the frame 1315.

To combine the broadcast screen in response to this changing process, it is necessary to acquire information about the changing process in advance in the image display apparatus 200.

In the present embodiment, control information required to combine the broadcast screen with the application screen in response to the changing process of the application screen is added to packet data of the frame 1309, which is N frames in advance of the frame 1310, at which the application screen starts changing.

That is, sequence information indicating a modification sequence of the broadcast screen in response to the changing process of the application screen and timing information indicating the time when the application screen starts changing are added to packet data 1316 of the frame 1309.

The control information and the format of packet data transmitted under the HDMI standard in the present embodiment are illustrated in FIG. 6, as in the case of the first embodiment.

The sequence information and the timing information according to the present embodiment are added to the packet body 602.

Information indicating that a modification is "moving the broadcast screen", "the coordinates of the moved broadcast screen", and "a moving step of the broadcast screen (moving distances in the vertical and horizontal directions)" is added to the sequence information.

Information indicating the number of frames (N in the example illustrated in FIG. 13) counting from a first frame to which the packet data is added (1309 in FIG. 13) to a second frame at which the change starts and indicating the modification interval representing a unit of frames of the occurrence of modification (M in FIG. 13).

In the image display apparatus 200, the main controller 201 acquires the sequence information and the timing information from the packet data 1316, generates commands for combining the broadcast screen in response to the screens 1302a, 1302b, 1302c, 1302d, and 1302e, which are changing application screens, and transmits the commands to the image controller 208.

At this time, a combining command for specifying a combined position for each of the screens (screens 1302a, 1302b, 1302c, 1302d, and 1302e) is generated, and the generated commands are connected in a list structure, as illustrated in FIG. 10. The timing of execution of each command is set such that the commands are executed in units of the number M of frames.

Therefore, the image controller 208 can acquire a command for real-time image control together with information indicating the timing of execution of the command in advance. Accordingly, a broadcast screen can be combined with an application screen in response to a changing process of the application screen without causing misregistration in combining.

Other Embodiments

The present invention is applicable as part of a system composed of a plurality of devices and also applicable to part of an apparatus composed of a single device.

The present invention is not limited to an apparatus and a method for realizing at least one of the above embodiments.

For example, a form that supplies program code of software for realizing at least one of the foregoing embodiments to a computer (CPU or microprocessor unit (MPU)) in the above system or apparatus is included in the scope of the present invention. In addition, the scope of the present invention also includes a case in which at least one of the foregoing embodiments is realized by causing the computer of the system or apparatus to operate the above various devices.

In this case, program code itself of the software performs the functions of the foregoing embodiments. That is, program code itself and a unit that supplies the program code to the computer, more specifically, a storage medium that stores the program code are included in the scope of the present invention.

Examples of such a storage medium that supplies program code include a floppy disk, a hard disk, an optical disk, a magneto-optical disk (MO), a compact-disk read-only memory (CD-ROM), a digital versatile disk (DVD), magnetic tape, a nonvolatile memory card, and a ROM.

The present invention is not limited to a case in which the functions of at least one of the foregoing embodiments are realized by controlling various devices in accordance with only the above program code. For example, the scope of the present invention includes a case in which at least one of the foregoing embodiments is realized by the program code in conjunction with an operating system (OS) running on a computer or other application software.

In addition, the scope of the present invention includes a case in which actual processing is performed in part or in entirety by a CPU or the like in a function expansion board in accordance with instructions of the program code stored in a memory included in the function expansion board.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-135345 filed May 22, 2007, which is hereby incorporated by reference herein in its entirety.

What is claimed is:

1. An information processing apparatus which transmits to an image display apparatus an image generated in the information processing apparatus, in a predetermined transmission format, as a video signal, the information processing apparatus comprising:

an acquiring unit configured to acquire a first image; and a transmitting unit configured to transmit to the image display apparatus modification information that indicates a process by which a second image is to be displayed in the image display apparatus simultaneously while the first image is displayed, and timing information that indicates a frame number at which displaying of the second image by the process is to be started, the modification information and the timing information being transmitted by adding to an area of control signal data included in the predetermined transmission format.

2. The information processing apparatus according to claim 1, wherein the transmitting unit is configured to add the first additional information and the second additional information to the first image and transmit the first image with the first and second additional information on a frame-by-frame basis of the first image.

3. The information processing apparatus according to claim 1, wherein the first image is transmitted in a transmission format based on a High-Definition Multimedia Interface (HDMI) standard to the image display apparatus, and at least one of the first additional information and the second additional information is added to a control signal data region contained in the transmission format.

4. The information processing apparatus according to claim 1, wherein the first image comprises an application screen generated by the information processing apparatus.

5. The information processing apparatus according to claim 1, wherein the second image comprises digital broadcast data capable of being received by the image display apparatus.

6. An image display apparatus which transmits to an image display apparatus an image generated in the information processing apparatus, in a predetermined transmission format, as a video signal, the image display apparatus comprising:

an acquiring unit configured to acquire a second image; and a receiving unit configured to receive from the information processing apparatus modification information that indicates a process by which the second image is to be displayed in the image display apparatus simultaneously while the first image is displayed, and timing information that indicates a frame number at which displaying of the second image by the process is to be started, the modification information and the timing information being transmitted by adding to an area of control signal data included in the predetermined transmission format.

7. The image display apparatus according to claim 6, further comprising:

a combining unit configured to combine the first image and the second image in accordance with the first additional information and the second additional information received by the receiving unit.

8. An information processing method for use in an information processing apparatus which transmits to an image display apparatus an image generated in the information processing apparatus, in a predetermined transmission format, as a video signal, the information processing method comprising:

acquiring a first image; and transmitting to the image display apparatus modification information that indicates a process by which a second image is to be displayed in the image display apparatus simultaneously while the first image is displayed, and timing information that indicates a frame number at which displaying of the second image by the process is to be started, the modification information and the timing information being transmitted by adding to an area of control signal data included in the predetermined transmission format.

9. A non-transitory computer-readable storage medium that stores a program that causes a computer to execute an image processing method according to claim 8.

10. An image display method for use in an image display apparatus which transmits to an image display apparatus an image generated in the information processing apparatus, in a predetermined transmission format, as a video signal, the image display method comprising:

acquiring a second image; and receiving from the information processing apparatus modification information that indicates a process by which the second image is to be displayed in the image display apparatus simultaneously while the first image is displayed, and timing information that indicates a frame number at which displaying of the second image by the process is to be started, the modification information and the timing information being transmitted by adding to an area of control signal data included in the predetermined transmission format.

11. A non-transitory computer-readable storage medium that stores a program that causes a computer to execute an image display method according to claim 10.

* * * * *